US011267947B2

(12) United States Patent
Edouard et al.

(10) Patent No.: US 11,267,947 B2
(45) Date of Patent: Mar. 8, 2022

(54) METHOD FOR MODIFYING THE SURFACE PROPERTIES OF ELASTOMER CELLULAR FOAMS

(71) Applicants: UNIVERSITE DE STRASBOURG, Stasbourg (FR); CENTRE NATIONAL DE LA RECHERCHE SCIENTIFIQUE, Paris (FR); UNIVERSITE CLAUDE BERNARD LYON 1, Villuerbanne (FR)

(72) Inventors: David Edouard, Dagneux (FR); Vincent Ritleng, Schiltigheim (FR); Loïc Jierry, Strabourg (FR); Nguyet Trang Thanh Chau Dalencon, Strasbourg (FR)

(73) Assignees: UNIVERSITE DE STRASBOURG, Strabourg (FR); CENTRE NATIONAL DE LA RECHERCHE SCIENTIFIQUE, Paris (FR); UNIVERSITE CLAUDE BERNARD LYON 1, Villuerbanne (FR)

(*) Notice: Subject to any disclaimer, the term of this patent is extended or adjusted under 35 U.S.C. 154(b) by 113 days.

(21) Appl. No.: 15/326,539

(22) PCT Filed: Jul. 9, 2015

(86) PCT No.: PCT/FR2015/051903
§ 371 (c)(1),
(2) Date: Jan. 16, 2017

(87) PCT Pub. No.: WO2016/012689
PCT Pub. Date: Jan. 28, 2016

(65) Prior Publication Data
US 2017/0210872 A1   Jul. 27, 2017

(30) Foreign Application Priority Data
Jul. 22, 2014   (FR) ...................................... 1457055

(51) Int. Cl.
*C08J 9/40* (2006.01)
*B01J 21/06* (2006.01)
(Continued)

(52) U.S. Cl.
CPC ............ *C08J 9/40* (2013.01); *B01D 39/1669* (2013.01); *B01J 21/063* (2013.01); *B01J 23/462* (2013.01);
(Continued)

(58) Field of Classification Search
CPC ........ C08J 9/40; C08J 9/365; C08J 2201/036; C08J 2205/04; C08J 2205/05; C08J 2347/04
(Continued)

(56) References Cited

U.S. PATENT DOCUMENTS

2008/0178738 A1* 7/2008 Chan .................. B01D 53/8678
95/141
2010/0239470 A1* 9/2010 Pham-Huu ................ C02F 1/32
422/186

FOREIGN PATENT DOCUMENTS

CN    102215879 A   * 10/2011  ................ C02F 1/32
CN    102215879 A1    10/2011
(Continued)

OTHER PUBLICATIONS

CN 103613780 English Abstract (Year: 2015).*
(Continued)

*Primary Examiner* — Kelly M Gambetta
(74) *Attorney, Agent, or Firm* — Jordan IP Law, LLC; Todd A. Vaughn (57) ABSTRACT

A method for modifying a cellular polymer foam with apparent porosity, which includes providing a cellular polymer foam with apparent porosity, placing the cellular polymer foam in contact with at least one compound in order to
(Continued)

obtain a cellular polymer foam including on the surface thereof an intermediate phase formed from the compound having at least one catechol unit. The foam may be used as a catalyst substrate.

14 Claims, 5 Drawing Sheets (51) Int. Cl.
 *B01J 23/46* (2006.01)
 *B01J 35/00* (2006.01)
 *C08J 9/36* (2006.01)
 *B01D 39/16* (2006.01)
 *B01J 37/02* (2006.01)
(52) U.S. Cl.
 CPC ......... *B01J 35/004* (2013.01); *B01J 35/0013* (2013.01); *B01J 37/0201* (2013.01); *B01J 37/0215* (2013.01); *C08J 9/365* (2013.01); *C08J 2201/036* (2013.01); *C08J 2205/04* (2013.01); *C08J 2205/05* (2013.01); *C08J 2375/04* (2013.01)

(58) Field of Classification Search
 USPC .......................................................... 427/244
 See application file for complete search history.

(56) References Cited

FOREIGN PATENT DOCUMENTS

| CN | 103566776 | A1 |   | 2/2014 |   |
|----|-----------|----|---|--------|---|
| CN | 103613780 | A  | * | 3/2014 |   |
| CN | 103613780 | A1 |   | 3/2014 |   |
| CN | 103566776 | B  | * | 6/2015 |   |
| CN | 103613780 | B  | * | 9/2015 | ............... C08J 9/40 |

OTHER PUBLICATIONS

Zhang et al. Coating of Open Cell Foams, Ind. Eng. Chem. Res. 2012, 51, pp. 9250-9259. (Year: 2012).*

McCloskey et al. A bioinspired fouling-resistant surface modification for water purification membranes, J. Mem. Sci. 413-414, 2012, pp. 82-90. (Year: 2012).*

* cited by examiner

METHOD FOR MODIFYING THE SURFACE PROPERTIES OF ELASTOMER CELLULAR FOAMS

CROSS-REFERENCE TO RELATED APPLICATIONS

The present application is a National Stage Application of PCT International Application No. PCT/FR2015/051903 (filed on Jul. 9, 2015), under 35 U.S.C. § 371, which claims priority to French Patent Application No. 1457055 (filed on Jul. 22, 2014), which are each hereby incorporated by reference in their respective entireties.

TECHNICAL FIELD

The invention relates to the field of porous solid materials, more particularly cellular polymer foams. It relates to a method for modifying the surface of elastomer cellular foams, in particular foams with apparent porosity, so that they may be used as catalyst substrates.

BACKGROUND

Many catalysts are known whereof the catalytic phase is present in a porous solid material, and more particularly adsorbed to the surface of a ceramic or metal cellular foam. For example, the most widely used method for producing ceramic foams consists of impregnating a polymer foam, most often a polyurethane or polyester foam, cut to the desired geometry, with a suspension of ceramic particles in an aqueous or organic solvent. The excess suspension is discharged from the polymer foam through the repeated application of compression or by centrifugation, so as to keep only a fine layer of suspension on the strands of the polymer. After one or several impregnations of the polymer foam, the latter is dried so as to evacuate the solvent while preserving the mechanical integrity of the deposited layer of ceramic powder. The foam is next sintered in order to obtain an inorganic foam usable as a catalyst substrate. This fairly complex manufacturing method creates a relatively high manufacturing cost.

One of the advantages of ceramic foams is their chemical and thermal strength. However, excellent thermal strength is not always needed. Furthermore, ceramic foams have the drawback of concealing micro-cracks and other microstructural flaws that considerably decrease their mechanical properties. Furthermore, in many cases, recovering the active metal phase (catalyst) requires many chemical treatments.

SUMMARY

One aim of the present invention is to provide new catalyst substrates that are an alternative to the catalyst substrates made from metal or ceramic foams currently used in the chemical, pharmaceutical and/or cosmetic industry in environments that do not require high thermal strength; are easy to prepare, with a low manufacturing cost; and have similar or advantageous structural characteristics.

Another aim of the present invention is to provide new catalysts, for heterogeneous and/or supported homogenous catalysis, with a low pressure loss and having a large specific surface, while having very good chemical inertia, and which are available in all types of geometric shapes (square, planar, cylindrical, etc.) and mechanically flexible.

According to the invention, the problem is resolved by chemically modifying the surface of a known cellular material, i.e., a cellular polymer foam (in particular elastomer) with apparent porosity.

Cellular polymer foams (also called "honeycomb foams") are well known and are commercially available for many applications. When they are made up of closed cells, they have excellent mechanical strength and are used as foam wedges, packaging foam, or in mechanical construction. At the same time, these closed cells capture air and thus give the foams excellent heat insulation properties, which are used in the building sector.

Also known are polymer foams (in particular elastomers) with apparent porosity (called "open-cell polymer foam"), in which only the edges of the cells are made up of solid polymer. This in particular involves polyurethane foams. They are used as filters, in particular in aquariums. However, these foams are not usable as a catalyst substrate due to the low adherence of the catalysts (or their precursor compounds) on the surface of this polymer.

Their use as a catalyst substrate is faced with the difficulty of depositing a catalytically active phase or an active phase precursor phase. Indeed, the surface of the polymer bridges (edges) is smooth, with no micro-pores, and does not have a sufficient adherence to deposit the precursor molecules or active phases thereon typically used in homogenous or heterogeneous catalysis. For this reason, cellular polymer foams with apparent porosity have hardly been considered as candidates to manufacture catalyst substrates.

The inventors have found an appropriate surface treatment that prepares the cellular polymer foams (in particular elastomers), and particularly those with apparent porosity, to receive a catalytically active phase (here called "active phase") or active phase precursor phase deposition.

A first object of the present invention is a method for modifying a cellular polymer foam with apparent porosity, preferably made from polyurethane, comprising the following steps: supplying a porous cellular polymer foam with apparent porosity (a) placing said cellular polymer foam in contact with at least one compound (b) chosen from among compounds including at least one catechol unit, and preferably from among catecholamines, to obtain a cellular polymer foam comprising, on its surface, an intermediate phase formed from said compound including at least one catechol unit.

Said cellular polymer foam is advantageously a polyurethane foam.

In one embodiment, the step for placing said cellular polymer foam (a) and the compound (b) in contact is done by immersing said cellular polymer foam (a) in an aqueous solution of compound (b), or by impregnating an aqueous solution of compound (b) on said cellular polymer foam (a), or by partial or complete spraying of an aqueous solution of compound (b) on said cellular polymer foam (a).

Advantageously, said cellular polymer foam (a) comprises cells with a mean size comprised between 500 µm and 5000 µm, preferably between 2000 µm and 4500 µm, and still more preferably between 2500 µm and 4500 µm; these values are chosen in order to use the foams as a catalyst substrate.

Compound (b) preferably includes one (preferably only one) amine function, and is advantageously chosen from among catecholamines, and is more particularly 4-(2-aminoethyl) benzene-1,2-diol (known by the name dopamine), or a derivative thereof. As an example, compound (b) can be chosen from the group made up of: dopamine, noradrenaline, adrenaline, 3-methoxytyramine, 4-aminophenol, 3,4-dihydroxyphenyl-L-alanine.

If compound (b) is not an amine, it is preferably chosen from the group of compounds including at least one catechol unit formed by: caffeic acid, hydroxyhydroquinone, catechol, pyrogallol, morin (2',3,4',5'7-pentahydroxyflavone), epigallocatechin, epigallocatechin gallate, catechin and its stereoisomers, tannic acid.

The method according to the invention may further include a step c) for functionalizing said cellular polymer foam by depositing a phase of at least one catalytically active material or catalytically active phase precursor, said at least one material (c) being selected from the group made up of:

metal complexes including at least one group capable of forming covalent bonds with the coating formed from compound (b), i.e., with the catechol or indole structural element (resulting from the cyclization of the alkylamine arm of the catecholamine during step (b)), for example a trialkoxysilane group, an amine group or a thiol group, and more particularly the coordinating compounds or organometallic molecules of the transition metals;

organic molecules capable of catalyzing the reaction, called organocatalysts, including at least one group capable of forming covalent bonds with the coating formed from compound (b);

metal nanoparticles, preferably metal nanoparticles chosen from among Ag, Fe, Co, Ni, Ru, Rh, Pd, Ir, Pt, Au, Ce, or those of mixed oxides associated with these elements, such as Fe2O3, NiO2, Ni2O3, CeO2, as well as from among those of other oxides, such as TiO2, ZnO, WO3, SnO2, or any possible combinations of these nanoparticles.

This functionalization step can be carried out after depositing compound (b) or simultaneously.

According to one embodiment, the functionalization step is done at a temperature comprised between 5 and 80° C., preferably between 15 and 60° C., and still more preferably between 15 and 50° C.

Said metal nanoparticles have a mean particle size comprised between 0.5 and 30 nm, preferably between 0.5 and 30 nm, more preferably between 0.5 and 20 nm, and still more preferably between 0.5 and 15 nm.

Said catalytically active phase or catalytically active phase precursor can be deposited using at least one of the following techniques: impregnation, aerosol, or droplets; chemical vapor deposition; capillary impregnation.

This step can be carried out after depositing compound (b) or simultaneously.

The cellular foam implemented in the context of the present invention assumes the form of blocks (for example, cylindrical or cubic) or plates with any shape, but the smallest outer dimension must be significantly larger than the mean size of the cells, and typically at least three times this value, preferably at least five times. As a general rule, the smallest dimension is larger than about 3 mm, preferably larger than about 10 mm, and still more preferably larger than about 20 mm.

Another object of the invention is a functionalized cellular polymer foam with apparent porosity, able to be obtained using the method according to the invention.

Still another object of the invention is the use of a cellular polymer foam with apparent porosity able to be obtained using the method according to the invention as a catalyst substrate.

Still another object of the invention is the use of a functionalized cellular polymer foam with apparent porosity able to be obtained using the method according to the invention as a catalyst, and more particularly as a supported homogenous and/or heterogeneous catalyst.

DRAWINGS

FIGS. 1 to 8 illustrate the invention.

FIG. 1 (b) shows a micrograph obtained by optical microscopy of a polyurethane cellular foam with apparent porosity used in the method according to the invention, identifying the characteristic properties of the foam (size of the cells "φ," pore sizes (i.e., window size) "a," and size of the bridges "ds").

FIGS. 3a, 3b and 3c show micrographs obtained by scanning electron microscopy (SEM) of the polyurethane elastomer cellular foam at different stages of the method according to the invention.

FIG. 6a shows the characteristic emission lines of the elements C, O and Ti, while FIG. 6b only shows the emission lines of the elements O and C.

FIGS. 7 and 8 relate to experiments done with a catalytic foam prepared according to example 8.

DESCRIPTION

The cellular (also called "honeycomb") polymer foams (and in particular elastomers) used in the context of the method according to the invention are so-called solid foams with apparent porosity. Preferably, these are polyurethane foams. The latter are commercially available in large tonnages and at low costs. They are flexible and withstand mechanical and chemical stresses particularly well, while having morphological properties allowing close mixing of the reagents, and thus the performance of chemical transformations under gentle conditions (primarily in terms of temperature and pressure) compared to systems where the catalyst is deposited on a substrate of a known type not assuming the form of an open-pore foam.

Figure 1:
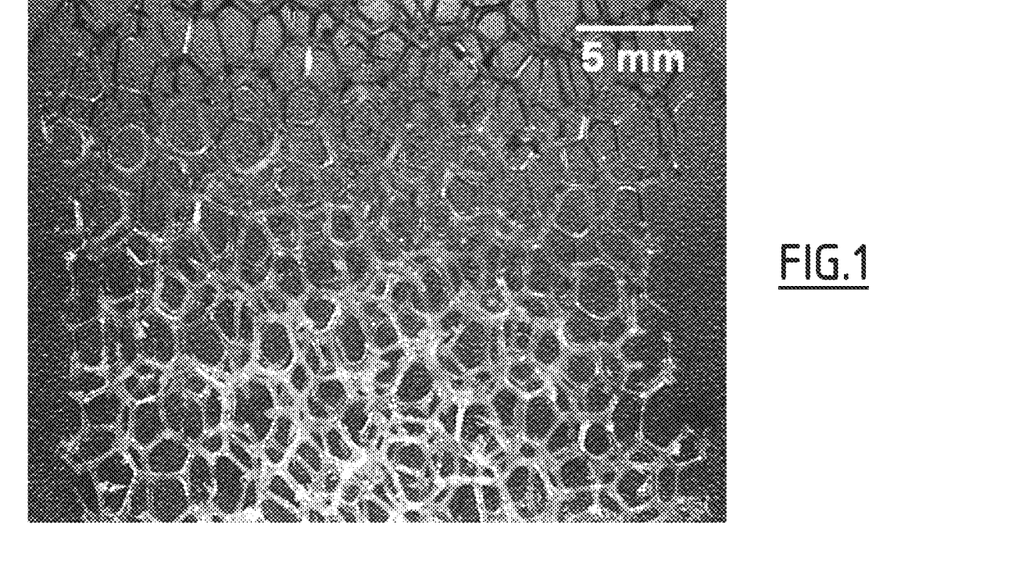
FIG. 1 shows a micrograph obtained by optical microscopy of a polyurethane cellular foam with apparent porosity used in the method according to the invention, whereof the cell size is about 4.433±0.362 mm; window size of about 2.423±0.341 mm; and bridge diameter of about 0.460±0.047 mm. The length of the white bar in the upper right indicates 5 mm.

Honeycomb or cellular foams with apparent porosity assume the form of structures made up of interconnected cells distributed randomly throughout the entire structure of the material. At first approximation, cellular foams have a geometry of the regular pentagonal dodecahedron type, and are classified based on their characteristic sizes (FIG. 1 b):

"φ": mean size of the cells, corresponding to the mean equivalent diameter of the sphere fitted in the cell;

"a": mean equivalent diameter of the opening of the pores, also called size of the "windows" or size of the "pores";

"ds": mean equivalent diameter of the bridges, also called characteristic length of the solid skeleton, here size of the "bridges."

In the trade, these foams are classified based on the number of pores (windows) per unit of length: PPI (pores per inch).

In another embodiment of the present invention, the modified open-cell foams according to the invention have a base of synthetic organic foam. This means that the foams according to the invention are manufactured from open-cell foams that include synthetic organic materials, preferably polyurethane foams. The preparation of polyurethane cellular foams is well known by those skilled in the art. Typically, such a foam may be obtained by polymerization reaction between isocyanate and alcohol.

The method for modifying cellular (or honeycomb) polymer foams (in particular elastomers) according to the invention is a method for modifying their surface. It comprises (preferably, essentially comprises) the following two steps: in a first step, a cellular polymer foam (a) is provided, preferably a polyurethane elastomer cellular foam, with apparent porosity, in a second step, said cellular polymer foam is placed in contact with at least one compound (b) chosen from among compounds including at least one catechol unit, and preferably from among the catecholamines.

Advantageously, said foam includes cells with a mean size φ comprised between 500 µm and 5,000 µm, preferably between 2,000 µm and 4,500 µm, and still more preferably between 2,500 µm and 4,500 µm.

Advantageously, the mean equivalent diameter a of the opening of the pores (windows) of the cellular polymer foam is comprised between 100 µm and 5,000 µm, preferably between 800 µm and 3,000 µm. In another embodiment, this parameter is between 1,700 µm and 4,500 µm.

Advantageously, the mean equivalent diameter ds of the bridges of the cellular polymer foam is comprised between 50 µm and 3,000 µm, preferably between 80 µm and 2,500 µm. In another embodiment, this parameter is situated between 200 µm and 2,500 µm.

Advantageously, the PPI number will be comprised between 5 PPI and 100 PPI, preferably between 30 and 75 PPI.

In a first advantageous embodiment, the mean cell size φ is between 2,000 µm and 4,500 µm, the mean window size a is between 800 µm and 3,000 µm, and the mean bridge diameter ds is between 80 µm and 2,000 µm.

In a second advantageous embodiment, the mean cell size φ is between 2,500 µm and 4,500 µm, the mean window size a is between 1,000 µm and 3,000 µm, and the mean bridge diameter ds is between 100 µm and 1,500 µm.

In a third advantageous embodiment, the mean cell size φ is between 3,000 µm and 5,000 µm, the mean window size a is between 1,300 µm and 3,500 µm, and mean bridge diameter ds is between 130 µm and 1,750 µm.

"Catecholamine" here refers to a compound including a catechol core (1,2-dihydroxybenzene), the benzene core further including a side chain of alkyl amine, optionally substituted. Components including a single amine function are preferred over those including several amines or a polyamine (or a component in which a catechol unit reacts with two amines), which should be avoided. According to the invention, said compound chosen from among the catecholamines (which are preferably catechol monoamines) is advantageously dopamine [4-(2-aminoethyl) benzene-1,2-diol (CAS: 51-61-6)], or a derivative thereof. Other compounds having a catechol unit and an amine function that can be used are for example noradrenaline, adrenaline and 3,4-dihydroxyphenyl-L-alanine. However, other molecules simply bearing the catechol unit may lead to a similar modification of the surface of the honeycomb polymer foams.

Thus, as an example, compound (b) can be chosen from the group formed by: dopamine, noradrenaline, adrenaline, 3-methoxytyramine, 4-aminophenol, caffeic acid, hydroxyhydroquinone, catechol, pyrogallol, morin (2',3,4',5'7-pentahydroxyflavone), epigallocatechin, epigallocatechin gallate, catechin and its stereoisomers, tannic acid, and 3,4-dihydroxyphenyl-L-alanine.

Although the chemical nature of polydopamine (and a fortiori that of the polymerization products of the other usable molecules as indicated above) is not yet clearly established, the inventors believe that the primary amine function, present [in] catecholamines, [plays] an important role in initiating the polymerization process: under oxidizing conditions, the dopamine transforms into an aromatic cycle of the indole type that is then the real polymerization monomer: the amine present in this indole derivative is a secondary amine.

Thus, the polymerization process according to the invention leads to a coating that is at least partially polymerized (intermediate phase) having few or no free primary amines; this is important to allow their use in catalysis. Indeed, the amine or ammonium surface groups are not favorable to bind metal or oxide nanoparticles. Groups are preferred of the sulfonate, alcohol or alcoholate, carboxylic acid or carboxylic, phenyl or phenolate type. Furthermore, the inventors have found that the presence of free amine groups does not allow the functionalization of foams including the intermediate phase according to the invention with other molecules of the amine or sulfur derivative type, to further have degrees of freedom in the modification of their surface for various catalytic applications.

For these reasons, in the context of the present invention, compounds of the catecholamine type are preferred over compounds including catechol units without a nitrogen function.

In one embodiment of the method according to the invention, at least one compound having at least one catechol unit, and preferably a compound in the catecholamine family, and still more preferably dopamine or 4-(2-aminoethyl)benzene-1,2-diol, is supplied with aqueous solution, with a quantity comprised between 0.05% to 10% by weight, preferably 0.1% to 1%. The step for placing the elastomer cellular foam (a) and the compound (b) in contact can be done via several methods. As an example, the contact can be done by immersion of the elastomer cellular foam (a) in an aqueous solution of compound (b); impregnating an aqueous solution of compound (b) on an elastomer cellular foam (a); or partial or complete spraying of an aqueous solution of compound (b) on the elastomer cellular foam (a).

Advantageously, the placement of the cellular polymer foam and the aqueous solution of compound (b) in contact, in particular by impregnation, immersion or spraying, is done for a period of time comprised between 1 and 48 hours, preferably 18 and 36 hours, and still more preferably between 20 and 30 hours.

Advantageously, the placement of the cellular polymer foam (a) and the compound (b) in contact is done in a temperature range from 0 to 100° C., preferably from 15 to 35° C., and particularly preferably from 20 to 30° C.

In one particularly advantageous embodiment, the cellular polymer foam (a) is placed in contact with an aqueous solution of compound (b) at a pH comprised between 5 and 10, preferably between 8 and 9. The pH of the solution can be checked by using a buffer solution, for example a tris(hydroxymethyl)aminomethane hydrochloride buffer solution (Tris.HCl; CAS: 1185-53-1).

Advantageously, the placement of the cellular polyurethane foam (a) and the compound (b) in contact can be carried out in an aqueous solution or in a water-miscible organic water/solvent mixture. The use of water as a solvent is preferred.

Several avenues for functionalizing cellular polymer foams with a modified surface through the cellular polymer foam transformation method according to the invention were considered and tested, in particular to be used as a catalyst substrate. To that end, the method according to the invention comprises an additional step c) for functionalizing the catalyst substrate by depositing a phase of at least one catalytically active material (c).

In one embodiment of the method for functionalizing the catalyst substrate according to the invention, the functionalization of the substrate is done by grafting a catalyst in the form of a metal complex, in particular a metal complex including at least one group capable of forming covalent bonds with the coating formed from compound (b), i.e., with the catechol or indole structural element (resulting from the cyclization of the alkylamine arm of the catecholamine during step (b)); said group may for example be an alkoxysilane group, a halogenosilane group (such as a chlorosilane group), an amine group or a thiol group, and the reactions performing the formation of covalent bonds can for example be condensation reactions with hydroxyl functions of the catechol structural element, reactions leading to imine formation, additions of type 1,4. or reactions of the radical type.

Said grafting of a metal complex makes it possible to obtain a supported homogenous catalyst also called single-site heterogeneous catalyst. Advantageously, the metal complexes (including at least one group capable of forming covalent bonds with the catechol and/or indole structural element) used in the context of the functionalization method according to the invention are chosen from among organometallic molecules or coordinating compounds, and more particularly from among those comprising at least one transition metal.

In one embodiment of the method for functionalizing a catalyst substrate according to the invention, the functionalization of the substrate is done by grafting a catalyst in the form of an organic molecule (organocatalyst), including at least one group capable of forming covalent bonds with the coating formed from compound (b), i.e., with the catechol or indole structural element (resulting from the cyclization of the alkylamine arm of the dopamine during step (b)); said group can for example be an alkoxysilane group, a halogenosilane group (such as a chlorosilane group), an amine group or a thiol group, and the reactions performing the formation of covalent bonds can for example be condensation reactions with hydroxyl functions of the catechol structural element, reactions carrying out imine formation, additions of type 1,4. or radical-type reactions.

The grafting of an organocatalyst makes it possible to obtain a supported organocatalyst.

In one embodiment of the method for functionalizing the catalyst substrate according to the invention, the functionalization of the substrate is done by non-covalent grafting of the catalyst in the form of metal particles, which are advantageously metal nanoparticles. The grafting of the metal particles on the surface of the substrate is effective due to the presence of catechol groups. One thus has a substrate for heterogeneous catalysts. Advantageously, the metal particles used in the context of the functionalization method according to the invention are chosen from among those of Ag, Fe, Co, Ni, Ru, Rh, Pd, Ir, Pt, Au, Ce, and those of mixed oxides associated with these elements, for example, $Fe_2O_3$, $NiO_2$, $Ni_2O_3$, $CeO_2$, as well as from among those of other oxides such as $TiO_2$, $ZnO$, $WO_3$, $SnO_2$, and all possible combinations of these nanoparticles. Advantageously, the metal nanoparticles used in the context of the method according to the invention have a mean particle size comprised between 0.5 and 100 nm, preferably 0.5 and 20 nm, and still more preferably between 0.5 and 15 nm. Taking account of the size of the catalytic nano-objects used may depend on their composition, and in particular their metal or oxide nature: the surface properties are strongly related to the size of the metal nanoparticles (gold and ruthenium, for example), less so in the case of oxides ($TiO_2$).

Preferably, the step for functionalizing the catalyst substrate is done by depositing the active phase using at least one of the following techniques: impregnation, aerosol, or droplets; chemical vapor deposition; capillary impregnation.

This functionalization step can be carried out after depositing compound (b) or at the same time.

Advantageously, the step for functionalizing the catalyst substrate is done at a temperature comprised between 5 and 80° C., preferably between 15 and 60° C., and still more preferably between 15 and 50° C.

The invention makes it possible to make notable improvements relative to the heterogeneous catalysts supported by rigid cellular foams, for example carbon foams, silicon carbide foams, metal foams, or alumina foams. Indeed, polyurethane foams, which are elastomer foams, have great flexibility and better impact resistance compared to the metal or ceramic foams typically used. Furthermore, the active phases of the cellular foams obtained using the method according to the invention can be recovered easily, for example through simple combustion of the cellular foams, which is a non-negligible advantage, in particular when the materials used as active phase are very costly. For the metal or ceramic foams according to the state of the art, recovering the active phase requires complex and polluting chemical treatments.

One particularity of the catalysis substrates according to the invention is related to the choice of compound (b), which is chosen from among compounds having at least one catechol unit, and preferably from among the catecholamines. Indeed, the primary drawback of polymer foams for use as a catalyst substrate is their low temperature resistance: it is not possible to subject the active phase precursors (for example, metal oxides) deposited on these substrates to the same activation treatments (typically: hydrogen production) as when they are deposited on a metal or ceramic foam because this reaction requires a temperature that risks damaging the polymer foam. This is one of the main reasons for which cellular polymer foams with apparent porosity have not been used as catalyst substrate (the other reason being the low adherence of the active phase precursors or active phases due to the smooth nature of the surface of the bridges that form the honeycomb foam). The inventors have found that modifying the surface of the cellular polymer foams according to the invention with a compound having at least one catechol unit, and preferably chosen from among catecholamines (such as dopamine), makes it possible to overcome both of these difficulties at the same time. In particular, it is possible to do away with the reduction phase of the active phase precursor deposited on said polymer foam because the catecholamines act as a reducing agent; this effect is more pronounced when said active phase precursor is deposited in the form of nanoparticles. Furthermore, the presence of a compound having at least one catechol unit, in particular the presence of a catecholamine, stabilizes the chemical integrity of the nanoparticles, in particular relative to the oxidizing action of the air, which may damage or deactivate the nanoparticles.

Furthermore, when the modified cellular polymer foam that may be obtained using the method according to the invention is used as a supported homogenous catalyst or as a supported organocatalyst (which is impossible with metal or ceramic foams, which may only be used as heterogeneous metal catalyst substrates), the separation of the products and the catalyst is made considerably easier relative to the non-supported catalysts in particular used in fine chemistry or in hydroformylation reactions, which allows the passage to the industrial scale for reactions for which it would have been impossible to consider using them under homogenous conditions, in particular due to the difficulty of separating the homogenous catalyst from the reaction products. Indeed, in certain sectors of chemistry, such as pharmaceutical chemistry, the residual metal level (coming from a metal catalyst) in the product obtained by catalysis must not exceed a threshold set at a very low level.

The method according to the invention allows catalytic reactions under "gentler" temperature and pressure conditions than in a traditional reactor (discontinuous, semi-continuous or closed reactor, called "batch reactor") owing to the material transfer properties of the foam, in particular in the case of bi-phase reactions (gas/liquid), as in hydrogenation or hydroformylation.

Thus, the modified cellular foams that may be obtained using the method according to the invention have many advantages relative to the rigid metal or ceramic foams currently used as catalyst substrates in the chemical, pharmaceutical and/or cosmetic industry. Indeed, rigid metal or ceramic foams have a certain number of limitations. In particular, they lack flexibility: the metal or ceramic foams traditionally used break very easily. Furthermore, the choice of catalyst types that can be supported is limited to metal (nano)particles adsorbed on the surface, therefore only heterogeneous metal catalysts. Furthermore, the catalysts deposited on these known substrates are not very durable, their aging primarily being due to the desorption and oxidation of the metal species on the foam. And lastly, rigid metal or ceramic foams are fairly expensive.

The cellular polymer foams modified according to the invention by placement in contact with at least one compound chosen from among the catecholamines undergo other chemical functionalization, for example covalent grafting of compounds including silane groups, amine groups or thiol groups. This makes it possible to further broaden the spectrum of surface properties that can be imparted to the cellular polymer foams using the method according to the invention.

EXAMPLES

The invention is illustrated below by eight examples, which are non-limiting with respect to the invention.

Example 1 pertains to placing a polyurethane cellular foam in contact with an aqueous dopamine solution.

Example 2 pertains to the functionalization of the cellular foam obtained in example 1 with an aqueous fluorescein-amine solution.

Example 3 pertains to the functionalization of the cellular foam obtained in example 1 with a suspension in aqueous medium of titanium dioxide $TiO_2$ nanoparticles.

Example 4 pertains to the functionalization of the cellular foam obtained in step 1 with a suspension in aqueous medium of ruthenium (Ru(0)) nanoparticles.

Example 5 pertains to the photocatalysis of acid orange 7 using the functionalized cellular foam obtained in example 3.

Example 6 pertains to hydrogenation tests of the styrene using the functionalized cellular foam obtained in example 4.

Example 7 pertains to the functionalization of a polyurethane cellular foam modified by dopamine, by the Michael 1,4-addition of a thiol or the Schiff base reaction (and/or by the Michael 1,4-addition) of an amine.

Example 8 pertains to a functionalization combined into one step of a polyurethane cellular foam with an aqueous dopamine solution containing titanium dioxide TiO2 nanoparticles.

In these examples, certain abbreviations have been used:
PU: Polyurethane foam
PDA: Polydopamine
PU-PDA: Polyurethane foam comprising an intermediate polydopamine phase on its surface.
Ru: Ruthenium.
Pu-PDA-Fluo: Polyurethane foam comprising an intermediate polydopamine phase and an upper fluoresceinamine phase.
PU-PDA-Ru(0): Polyurethane foam comprising an intermediate polydopamine phase and a catalytic active phase made up of ruthenium nanoparticles.
PU-PDA-TiO2: Polyurethane foam comprising an intermediate polydopamine phase and a catalytic active phase made up of titanium dioxide nanoparticles.
a.t.: ambient temperature Example 1

Standard Procedure for Polydopamine (PDA) Grafting on the Polyurethane (PU) Foam Surface to Obtain a PU-PDA Foam In example 1, a polyvalent substrate for heterogeneous catalysts or supported homogenous catalysts was obtained by placing a polyurethane elastomer cellular foam in contact with a dopamine solution, this method corresponding to reaction diagram 1 below:

Reaction diagram 1: Preparation of a catalytic support

In an agitated solution of 4-(2-Aminoethyl)-1,2-benzenediol hydrochloride (CAS: 62-31-7, also called dopamine hydrochloride), prepared by dopamine hydrochloride dissolution (2 mg/mL) in an aqueous solution (60 mL) of tris(hydroxymethyl)aminomethane (sometimes called "Tris"; CAS 77-86-1) at a molar concentration of 10 mM, the pH of which is adjusted to 8.5 by the dropwise addition of an aqueous solution of HCl at 1 M, is submerged in a C31410 Bulpren™ polyurethane foam specimen from the company Recticel® or 8FM2 from the company Foampartner® measuring 2×2×2 cm$^3$ and having a mass comprised between 200 and 250 mg. The reaction mixture is agitated at ambient temperature for 24 hours. The dopamine to polydopamine polymerization process is characterized by the change of color of the reaction medium to dark brown. The polyurethane foam grafted with the polydopamine (PU-PDA) is next rinsed with ultrapure water (MiliQ), then agitated in 50 mL of MiliQ water for 10 min. The washing procedure is repeated 5 times. The persistent brownish color on the surface of the foam is characteristic of the effective grafting of the PDA. The obtained product is dried by compressed air flow, then in a drying oven (60-70° C.) for one night.

Figure 2A:
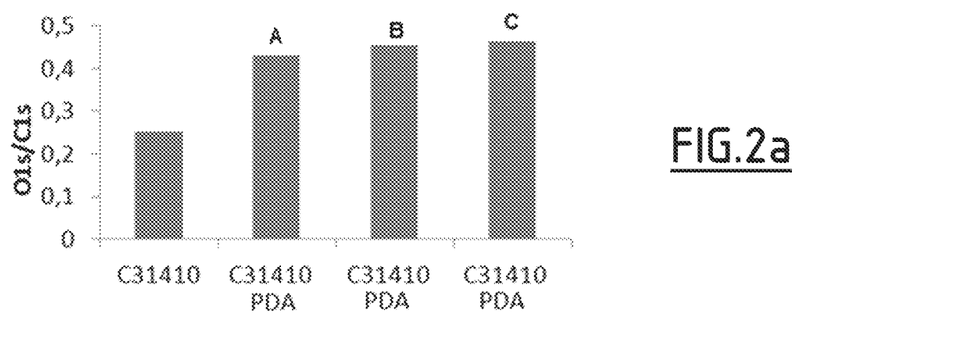
FIG. 2a shows results obtained by x-ray photoelectron spectroscopy of the O1s/C1s atomic ratio, measured on the surface of the polyurethane elastomer cellular foam of type C31410 Bulpren™ by the company Recticel®, unmodified and in several states of the method according to the invention (control C31410 polyurethane foam: diagram; after being placed in contact with compound (b) and a single wash=bar A; after two washes=bar B; after three washes=bar C). An increase is observed in the proportion of oxygen atoms between the control C31410 foam and the foams modified by compound (b), control for the adhesion of the polydopamine (here called PDA) (polymerization product of compound (b)). After 1, 2 or 3 successive washes, the O1s/C1s ratio remains unchanged, reflecting the robust nature of the modification.
Figure 2B:
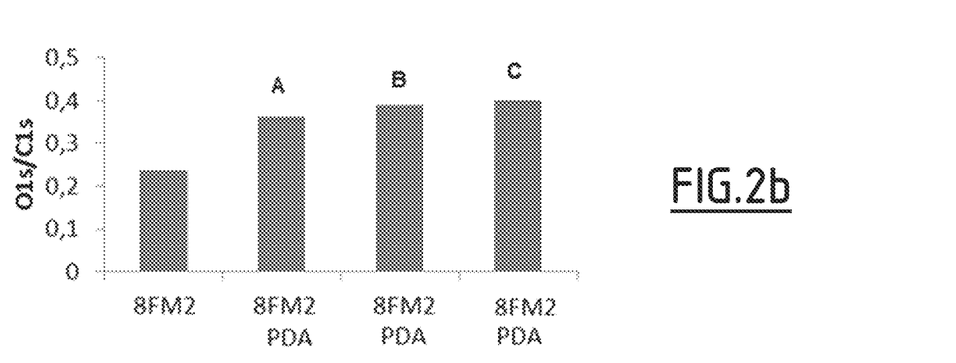
FIG. 2b shows results obtained by x-ray photoelectron spectroscopy of the O1s/C1s atomic ratio, measured on the surface of the polyurethane elastomer cellular foam of type 8FM2 by Foampartner®, unmodified and in several states of the method according to the invention (control 8FM2 polyurethane foam: diagram; after placement in contact with compound (b) and a single wash=bar A; after two washes=bar B; after three washes=bar C). The increase in the proportion of oxygen atoms relative to carbon atoms between the 8FM2 control foam and the foams modified by compound (b) attests to the grafting of the PDA (compound (b)). This grafting is robust in light of the lack of variation of the O1s/C1s ratio measured after 1, 2 or 3 wash steps; cf. bars A, B and C, respectively.
Figure 3A:
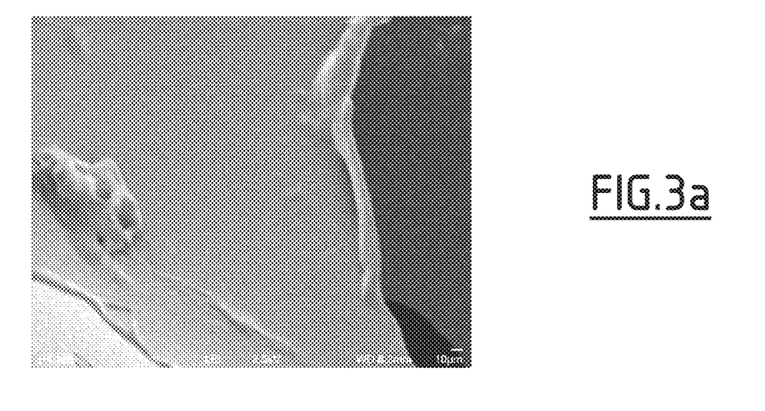
FIG. 3a is a micrograph of the non-modified polyurethane foam of type C31410 Bulpren™ by Recticel®. The length of the white bar in the bottom right indicates 10 μm.
Figure 3B:
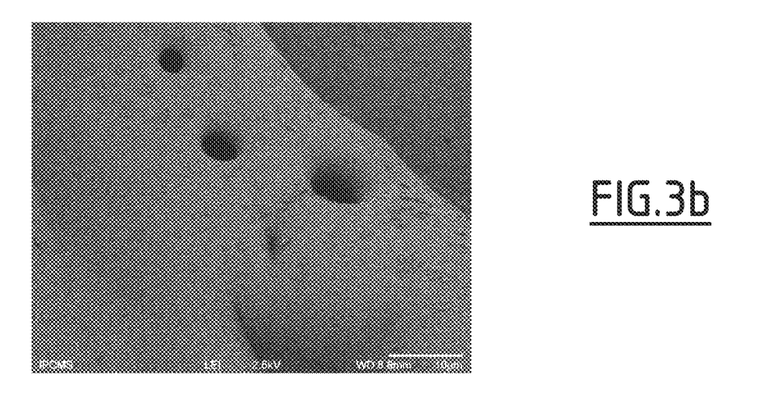
FIG. 3b is a micrograph of the polyurethane foam shown in FIG. 3a after placement in contact with an aqueous dopamine solution, also called 4-(2-aminoethyl) benzene-1,2-diol (CAS: 51-61-6). The length of the white bar in the bottom right indicates 10 μm.

Analyses of the surface of the foam obtained by x-ray photoelectron spectroscopy (XPS) confirm the adsorption of the polydopamine to the surface of the C31410 Bulpren™ polyurethane foam specimen from the company Recticel® or 8FM2 from the company Foampartner® (cf. FIGS. 2a and 2b). The significant increase in the O(1s)/C(1s) atomic ratio measured by XPS between the non-modified and modified elastomer foams attests to the presence of PDA and its resistance to washing. Furthermore, scanning electron microscopy (SEM) analyses confirm the presence of PDA on the surface of the C31410 Bulpren™ polyurethane foam specimen from the company Recticel® (cf. FIGS. 3a and 3b).

Example 2

Standard Procedure for Fluoresceinamine Grafting on the Surface of Polyurethane Foam Functionalized with Polydopamine (PU-PDA)

In this example, the PU-PDA foam obtained in example 1 was functionalized with an aqueous fluoresceinamine solution to form a fluorescent compound called PU-PDA-Fluo. The purpose of this example is in particular to demonstrate that it is possible to functionalize the polydopamine by reaction with an amine group (by Schiff base reaction and/or Michael 1,4-addition), which makes it possible to consider PU-PDA functionalization with any molecule including an amine group, including metal complexes. This fluorescent compound in fact allows easy viewing of the functionalization of the polydopamine layer formed on the surface of the polyurethane foam using optical fluorescence microscopy techniques.

The PU-PDA foam prepared according to example 1 is submerged in an agitated solution of 5-aminofluorescein (CAS: 3326-34-9, also called fluoresceinamine, isomer I), prepared by dilution of 5-aminofluorescein (0.5 mg/mL) in an aqueous solution of Tris.HCl at 10 mM (pH 8.5, 60 mL) prepared according to example 1. The reaction mixture is agitated and heated at 60° C. for 3 hours, then agitated at ambient temperature for 16 hours. The PU-PDA foam grafted with the fluoresceinamine (PU-PDA-fluoresceinamine) is next rinsed with ultrapure water (MiliQ), then agitated in 50 mL of MiliQ water for 10 min. The washing procedure is repeated 3 times. The PU-PDA-Fluo foam thus obtained is dried by compressed air flow, then is kept at ambient temperature. The fluorescence microscopy analysis (excitation at 365 nm) confirms the presence of fluoresceinamine on the PU-PDA-Fluo foam surface; the layer is continuous and homogenous. The fluorescence intensity (measured using the ImageJ® software) on a given surface is twice as high when the PU-PDA foam is modified by fluoresceinamine, relative to the same foam not modified.

Furthermore, the presence of the fluoresceinamine on the PU-PDA-Fluo foam surface has also been demonstrated by XPS. A decrease of 34% of the O(1s)/C(1s) atomic ratio and of 14% of the N(1s)/C(1s) ratio between the PU-PDA foam and the PU-PDA-Fluo foam attests to the grafting of the amine derivative.

A similar experiment was conducted with the 8FM2 polyurethane foam by the company Foampartner®, with a similar result.

Example 3

Standard Procedure for Grafting TiO2 Nanoparticles on the Polyurethane Foam Surface Functionalized with Polydopamine (PU-PDA)

In this example, the PU-PDA foam obtained in example 1 was functionalized with a suspension in aqueous medium of titanium dioxide metal nanoparticles to form a catalyst called PU-PDA-TiO2.

One gram of a commercial nanopowder of TiO2 (of the anatase type and with a particle size of about 15 nm) is added to an aqueous solution of Tris.HCl 10 mM (pH 8.5, 50 mL) prepared according to example 1. After having been agitated overnight at 1,000 revolutions/minute using a magnetic agitator, the TiO2 suspension is treated by ultrasound for 30 min. in a water bath (25° C.) to obtain a well-dispersed suspension of TiO2 nanoparticles. The PU-PDA foam prepared according to example 1 is submerged in this suspension of TiO2 nanoparticles, then the reaction mixture is agitated at about 1,000 revolutions/minute and heated at 40° C. for 3 hours. The PU-PDA foam grafted with the TiO2 nanoparticles (PU-PDA-TiO2) is next rinsed with MiliQ ultrapure water, then agitated in 50 mL of MiliQ water for 10 min. The washing procedure is repeated 5 times. The obtained product (PU-PDA-TiO2) is dried by compressed air flow, then in the drying oven (60-70° C.) for one night.

Figure 3C:
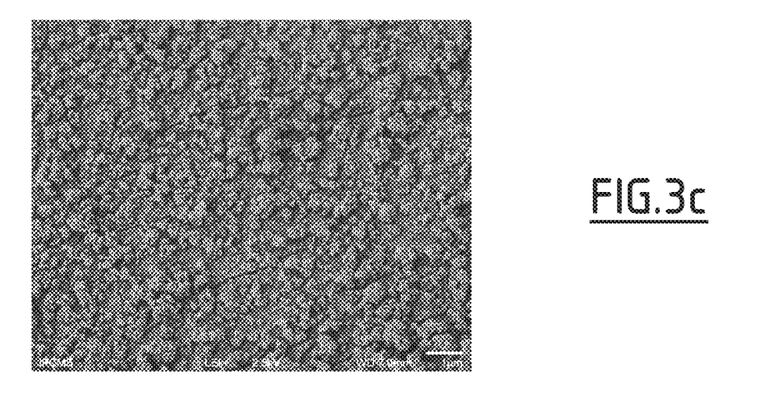
FIG. 3c is a micrograph of the polyurethane foam after the foam obtained in FIG. 3b is placed in contact with an aqueous solution of TiO2 nanoparticles. The length of the white bar in the bottom right indicates 1 μm.
Figure 6A:
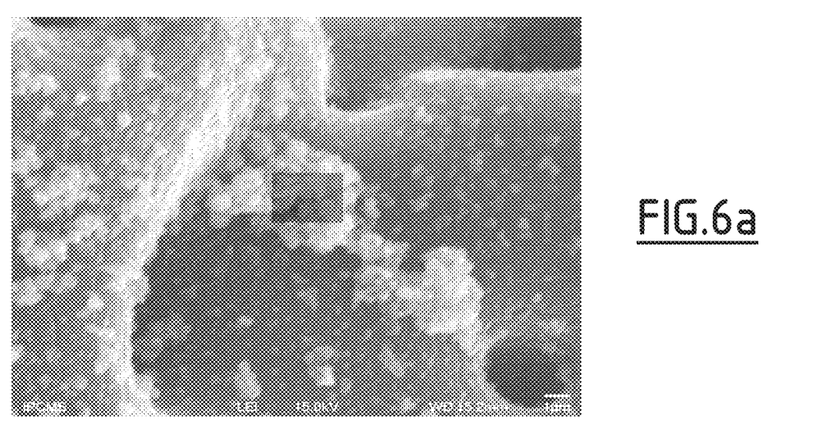
FIGS. 6a and 6b show micrographs obtained by SEM (acceleration voltage 15.0 kV) of a polyurethane elastomer cellular foam after functionalization with dopamine and deposition of a TiO2 nanopowder. The length of the white bar in the upper right indicates 1 µm. The dark rectangle in each figure indicates the zone in which the chemical composition has been analyzed by EDX spectroscopy (x-ray emission caused by the electron beam of the SEM apparatus)
Figure 6B:
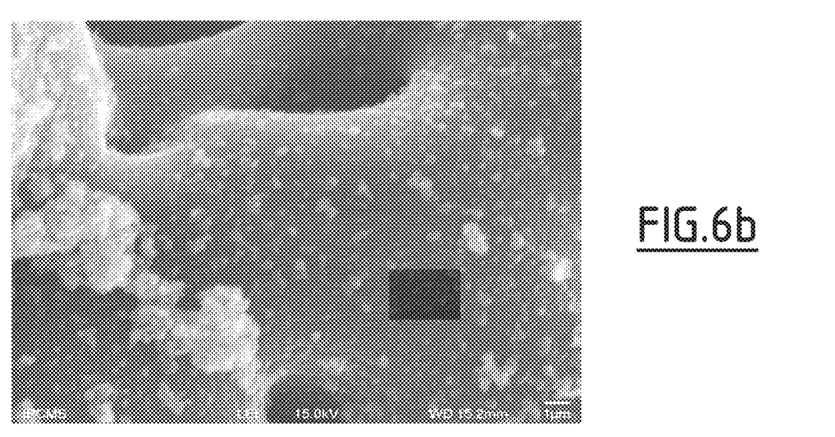
Figure 7:
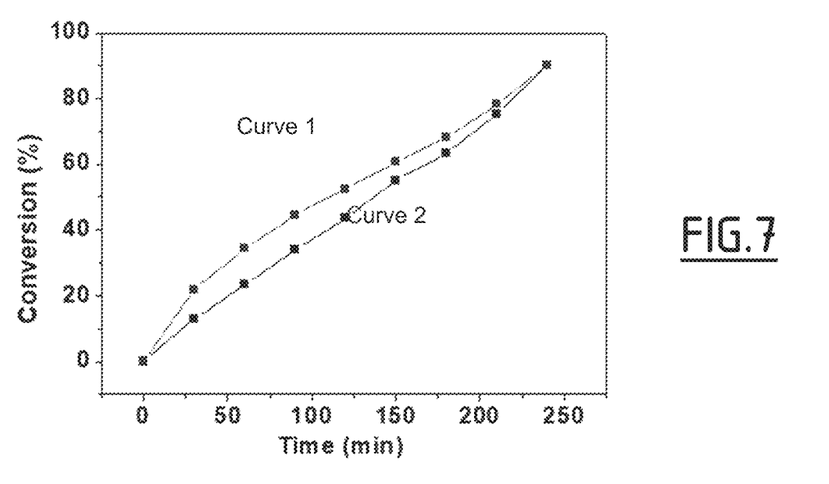
FIG. 7 relates to a photocatalytic performance test of a catalytic foam prepared according to example 8. It corresponds to a conversion test as a function of time for a polyurethane elastomer cellular foam after functionalization with dopamine and deposition of a TiO2 nanopowder, new (curve 1) and after 5,000 compression cycles at 25% (curve 2).
Figure 8:
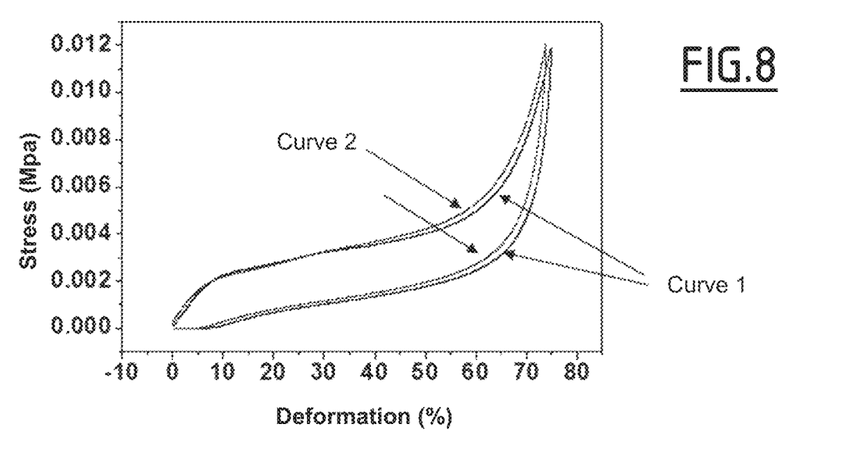
FIG. 8 shows the stress—deformation curve for a new specimen (curve 1) and after 5,000 compression cycles at 25% (curve 2).

The photoelectron spectrometry analyses (% Ti2p/% C1s=0.09871) and scanning electron microscopy (SEM) analyses confirm the presence of TiO2 nanoparticles on the surface of the PU-PDA foam (cf. FIGS. 3c, 6a and 6b).

Example 4

Standard Procedure for Grafting Ru(0) Nanoparticles on the Polyurethane Foam Surface Functionalized with Polydopamine (PU-PDA)

In this example, the PU-PDA foam obtained in example 1 was functionalized with a suspension in aqueous medium of metal ruthenium nanoparticles to form a catalyst called PU-PDA-Ru(0). The reaction diagram for the preparation of this foam is shown below:

Reaction diagram 2: Preparation of a ruthenium nanoparticle-based catalyst

Added dropwise to an aqueous solution (50 mL) of RuCl3.3H2O (26.1 mg; 0.1 mM) is a freshly prepared aqueous solution (1.8 mL) of NaBh4 at 0.1 M under vigorous agitation and at ambient temperature. The reduction process occurs quickly and is characterized by the gradual change of color; from dark brown to light brown, then green-brown, and lastly back to dark brown. The addition of NaBH4 is complete when the reaction medium has become dark brown again (pH<4.9). The colloidal solution is next agitated for one night at ambient temperature to obtain a well-dispersed suspension of ruthenium(0) nanoparticles, with a particle size comprised between 1 and 2 nm.

The PU-PDA foam prepared according to example 1 is submerged in this ruthenium nanoparticle suspension, then the reaction medium is agitated at ambient temperature for 24 hours. The PU-PDA foam grafted with the ruthenium(0) nanoparticles (PU-PDA-Ru(0)) is next rinsed with MiliQ water, then agitated in 50 mL of MiliQ water for 10 min. The washing procedure is repeated 5 times. The PU-PDA-Ru(0) is dried by compressed air flow, then in the drying oven (60-70° C.) for one night.

Example 5

Photocatalysis of Acid Orange 7 Using PU-PDA-TiO2 as Catalyst

In this example, a photocatalysis test of acid orange 7 (AO7) was done using the PU-PDA-TiO2 cellular foam obtained in example 3. The reaction diagram is shown below:

Reaction diagram 3: Photocatalysis of acid orange AO7

Figure 4:
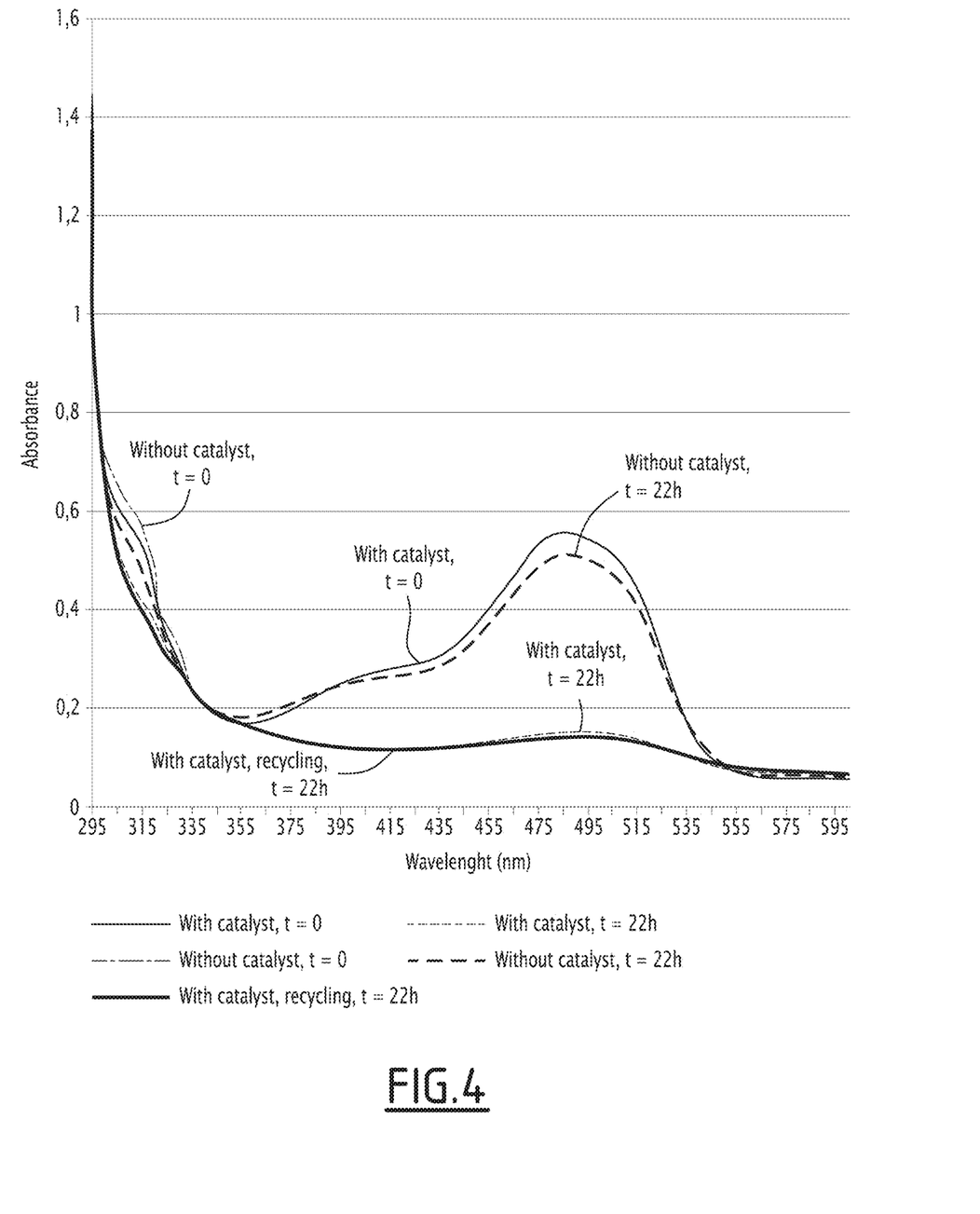
FIG. 4 shows the evolution of the absorption spectrum of Acid Orange 7 (AO7 or 4-[(2E)-2-(2-oxonaphthalen-1- ylidene-hydrazinyl]sodium benzenesulfonate; CAS: 633-96-5) with or without the presence of TiO2 nanoparticles and at t=0 and t=22 hours, and at t=22 hours during a second catalytic cycle with the same reused polyurethane foam.
Figure 5A:
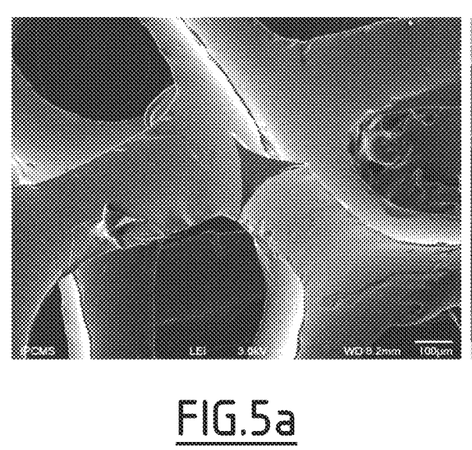
FIGS. 5a and 5b show micrographs obtained by SEM (acceleration voltage 3.0 kV) of an untouched polyurethane elastomer cellular foam (FIG. 5a) and one functionalized by a dopamine deposit (FIG. 5b) using the method according to the invention. The length of the white bar in the upper right indicates 100 µm.
Figure 5B:
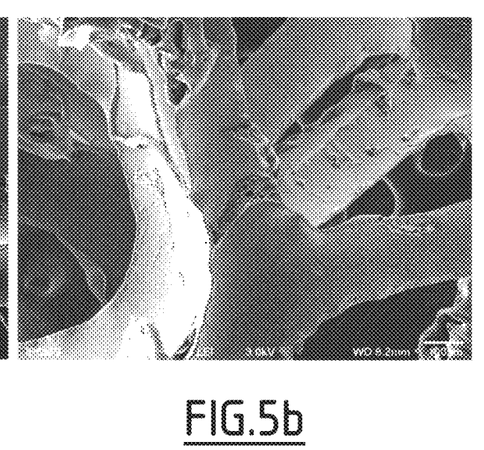

Four specimens of PU-PDA-TiO2 foams (previously prepared according to example 3, and measuring 0.5×2×2 cm3) are submerged in an aqueous solution (50 mL) of 4-(2-hydroxy-1-naphthylazo)benzenesulfonic acid sodium salt (CAS: 633-96-5, usually called acid orange 7 or AO7) at a concentration of 2.7·10−5 M (pH ~5.4), placed in a 100-mL beaker. The solution is agitated at 250 revolutions/minute using a magnetic agitator in the dark for 30 min. to balance, then irradiated by 3 bulbs (1 visible bulb at 100 W placed above, and 2 UVA bulbs (λmax=365 nm) at 6 W and 4 W, respectively, placed on the sides). The reaction medium is agitated for 22 hours. The catalytic transformation of the AO7 is characterized by the discoloration of the solution and is monitored by UV-visible spectrophotometry (cf. UV spectrums—FIG. 4). This catalytic conversion is complete in 22 hours, and the foams can be reused at least once after washing with ultrapure water (MiliQ) without loss of activity.

Example 6

Styrene Hydrogenation Using PU-PDA-Ru(0) as Catalyst

In this example, the hydrogenation of the styrene 1 into ethylbenzene 2 was done using the PU-PDA-Ru(0) cellular foam obtained in example 4. The reaction diagram is shown below:

Reaction diagram 4: Styrene hydrogenation

According to the state of the art, this reaction can form as a secondary product of the ethylcyclohexane 3.

The hydrogenation of the styrene 1 is done in a glass 4-neck reactor (250 mL) equipped with a condenser. The PU-PDA-Ru(0) is fixed at the end of the mechanical agitator in a glass cage with holes. The catalyst is submerged in a styrene solution (0.23 mL; 0.02 M) in ethanol (100 mL). The reaction medium is heated at 70° under mechanical agitation (about 450 revolutions/minute) and the hydrogen is boiled continuously in the solution with the flow rate of 60 mL/min. After 6 and 22 hours of reaction, 0.5 mL of the reaction medium is withdrawn and analyzed by gas chromatography to determine the conversion. After 6 hours of reaction, 4% ethylbenzene 2 is obtained; after 22 hours of reaction, 7% ethylbenzene 2 is obtained. The quantity of ethylcyclohexane 3 formed was negligible, which emphasizes the selectivity of the reaction with this catalytic system.

This example also demonstrates that if dopamine is used as compound (b) in the method according to the invention, it is possible to eliminate the step for reducing the active phase (Ru). This step is necessary or even essential in the case of systems according to the state of the art where the catalyst is deposited on a ceramic, carbon or metal substrate.

Example 7

Functionalization of the PU-PDA Foams by Grafting a Thiol or an Amine

HS—(CH2)2-COOH was grafted on a C31410 Bulpren™ polyurethane foam by the company Recticel® modified with polydopamine (PU-PDA) via the Michael 1,4-addition of the thiol function on the aromatic cycle of the PDA. To that end, HS—(CH2)2-COOH was used at a rate of 0.5 mg/mL in an aqueous solution of NaOH (0.1 M) at ambient temperature. The presence of the thiol on the PU-PDA foam thus modified was demonstrated by XPS. The significant increase in the S(2p)/C(1s) atomic ratio measured by XPS between the non-modified PU-PDA foam and the modified PU-PDA foam attests to the presence of the thiol. The same experiment was done with the 8FM2 polyurethane foam by the company Foampartner® with a similar result.

In another experiment, NH2-(CH2)6-NH2 was grafted on a C31410 Bulpren™ polyurethane foam by the company Recticel® modified with polydopamine (PU-PDA) via a Schiff base reaction (and/or a Michael 1,4 reaction). To that end, NH2-(CH2)6-NH2 was used under the following conditions: at a rate of 0.5 mg/mL in an aqueous Tris solution (15 mM) with a pH of 8.6 at 60° C. for three hours, followed by 16 hours at a.t. The presence of the amine on the PU-PDA foam thus modified was demonstrated by XPS. The 14% decrease of the O(1s)/C(1s) atomic ratio and the 63% increase of the N(1s)/C(1s) atomic ratio measured by XPS between the non-modified PU-PDA foam and the modified PU-PA foam attests to the presence of the amine. A similar experiment was done with the 8FM2 polyurethane foam by the company Foampartner®, with a similar result.

Example 8

Obtainment of a PU-PDA Foam Grafted with TiO2 Nanoparticles (called PDU-PDA-TiO2) in a Single Step In this example, a PU-PDA-TiO2 catalyst was obtained in a single step by placing a polyurethane elastomer cellular foam in contact with a suspension of titanium oxide metal nanoparticles in a dopamine aqueous solution.

Reaction diagram 5: Preparation of a PU-PDA-TiO2 catalyst in a single step

2% (w/v) of a commercial TiO2 nanopowder (of the anatase type and with a particle size of about 30 nm) was added to an aqueous solution of Tris.HCl 10 mM (pH 8.5) prepared according to example 1. After agitation for 12 hours at 1,000 revolutions/minute using a magnetic agitator, 2 mg/mL of 4-(2-aminoethyl)-1,2-benzenediol hydrochloride (CAS: 62-31-7, also called dopamine hydrochloride) was added. In this TiO2 nanoparticle suspension, a polyurethane foam specimen similar to that used in example 1 is submerged, then the reaction mixture is agitated at about 1,000 revolutions/minute and heated at 40° C. for 24 hours. The PU-PDA foam grafted with the TiO2 nanoparticles (PU-PDA-TiO2) is next rinsed with MiliQ ultrapure water, then agitated in 50 mL of MiliQ water for 10 min. The washing procedure is repeated 5 times. The obtained product (PU-PDA-TiO2) is dried by compressed air flow, then in the drying oven (60-70° C.) for at least 12 hours.

What is claimed is:

1. A method for modifying a cellular elastomer foam with apparent porosity, the method comprising:
   supplying a porous cellular elastomer foam with an apparent porosity and having a mean equivalent diameter of the opening of the pores comprised between 100 μm and 5,000 μm; and
   placing said porous cellular elastomer foam in contact with at least one compound including at least one catechol unit, and polymerizing said compound including at least one catechol unit on the surface of said porous cellular elastomer foam, thereby obtaining a mechanically flexible catalyst substrate comprising said cellular elastomer foam having on its surface an intermediate phase formed from said at least one compound including at least one catechol unit.

2. A method for modifying a cellular elastomer foam with apparent porosity, the method comprising:
   supplying a porous cellular elastomer foam with an apparent porosity and having a mean equivalent diameter of the opening of the pores comprised between 100 μm and 5,000 μm; and
   placing said porous cellular elastomer foam in contact with at least one compound including at least one catechol unit, and polymerizing said compound including at least one catechol unit on the surface of said porous cellular elastomer foam, thereby obtaining a substrate comprising said cellular elastomer foam having on its surface an intermediate phase formed from the polymerisation of said at least one compound including at least one catechol unit, wherein the substrate is mechanically flexible.

3. The method of claim 2, wherein said at least one compound including at least one catechol unit comprises a catecholmonoamine.

4. The method of claim 2, wherein placing said porous cellular elastomer foam in contact comprises one of:
   immersing said porous cellular elastomer foam in an aqueous solution of the at least one compound;
   impregnating an aqueous solution of the at least one compound on said porous cellular elastomer foam; and
   partially spraying an aqueous solution of the at least one compound including at least one catechol unit on said porous cellular elastomer foam.

5. The method of claim 2, wherein placing said porous cellular elastomer foam in contact comprises one of:
   immersing said porous cellular elastomer foam in an aqueous solution of the at least one compound;
   impregnating an aqueous solution of the at least one compound on said porous cellular elastomer foam; and
   completely spraying an aqueous solution of the at least one compound including at least one catechol unit on said porous cellular elastomer foam.

6. The method of claim 2, wherein said porous cellular elastomer foam comprises cells with a mean size comprised between 2,500 μm and 4,500 μm.

7. The method of claim 2, wherein the at least one compound including at least one catechol unit is chosen from among catecholamines is 4-(2-aminoethyl) benzene-1, 2-diol, or a derivative thereof.

8. The method of claim 2, further comprising:
   functionalizing said porous cellular elastomer foam by depositing a phase of at least one catalytically active material or at least one catalytically active phase precursor.

9. The method of claim 7, wherein said at least one catalytically active material is selected from the group consisting of:
   metal complexes including at least one group capable of forming covalent bonds with the catechol or indole structural element resulting from the cyclization of the alkylamine arm of the catecholamine during placing said porous cellular elastomer foam in contact with the at least one compound;
   organic molecules which are configured to catalyze the reaction, including at least one group to form covalent bonds with the coating formed from at least one compound; and
   metal nanoparticles chosen from among Ag, Fe, Co, Ni, Ru, Rh, Pd, Ir, Pt, Au, Ce, or mixed oxides associated with these elements, or any combination(s) thereof.

10. The method of claim 9, wherein the metal nanoparticles have a mean particle size comprised between 0.5 and 15 nm.

11. The method of claim 9, wherein functionalizing the catalyst substrate is conducted by depositing the active phase using at least one of:
   impregnation, aerosol, or droplets;
   chemical vapor deposition; and
   capillary impregnation.

12. The method of claim 9, wherein functionalizing the catalyst substrate is conducted after depositing the at least one compound including at least one catechol unit, or simultaneously.

13. The method of claim 9, wherein functionalizing the catalyst substrate is conducted at a temperature of between 15 and 50° C.

14. The method of claim 2, wherein the cellular elastomer foam comprises polyurethane.

* * * * *